United States Patent
Hsu (10) Patent No.: US 7,439,975 B2
(45) Date of Patent: Oct. 21, 2008

(54) METHOD AND SYSTEM FOR PRODUCING DYNAMICALLY DETERMINED DROP SHADOWS IN A THREE-DIMENSIONAL GRAPHICAL USER INTERFACE

(75) Inventor: Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 09/965,145

(22) Filed: Sep. 27, 2001

(65) Prior Publication Data

US 2003/0058241 A1    Mar. 27, 2003

(51) Int. Cl.
*G06T 15/50* (2006.01)
(52) U.S. Cl. .................. 345/426; 345/782; 345/848; 345/849; 345/850; 345/851; 345/852
(58) Field of Classification Search .................. 345/426, 345/782, 848–852
See application file for complete search history.

(56) References Cited

U.S. PATENT DOCUMENTS

| | | | | |
|---|---|---|---|---|
| 4,600,200 | A | * 7/1986 | Oka et al. ...................... | 463/33 |
| 5,043,922 | A | 8/1991 | Matsumoto ................ | 364/522 |
| 5,143,433 | A | * 9/1992 | Farrell .......................... | 362/29 |
| 5,264,836 | A | 11/1993 | Rubin ........................ | 345/157 |
| 5,359,703 | A | 10/1994 | Robertson et al. ........... | 395/119 |
| 5,422,986 | A | 6/1995 | Neely .......................... | 395/126 |
| 5,513,303 | A | 4/1996 | Robertson et al. ........... | 395/119 |
| 5,651,107 | A | 7/1997 | Frank et al. ................. | 395/344 |
| 5,739,819 | A | 4/1998 | Bar-Nahum ................ | 345/426 |
| 5,742,749 | A | 4/1998 | Foran et al. ................. | 395/126 |
| 5,771,036 | A | 6/1998 | Martin et al. ............... | 345/145 |
| 5,870,097 | A | 2/1999 | Snyder et al. ............... | 345/426 |
| 5,870,098 | A | 2/1999 | Gardiner .................... | 345/426 |
| 5,893,132 | A | 4/1999 | Huffman et al. ............. | 707/532 |
| 5,898,433 | A | 4/1999 | Hijikata ...................... | 345/344 |
| 5,903,271 | A | 5/1999 | Bardon et al. ............... | 345/419 |

(Continued)

FOREIGN PATENT DOCUMENTS

JP         08-016137         1/1996

OTHER PUBLICATIONS

Soler et al., "Fast Calculation of Soft Shadow Textures Using Convolution", *Proceedings of the 25th Annual Conference on Computer Graphics*, pp. 321-332, Jul. 19, 1998.

*Primary Examiner*—Mark Zimmerman
*Assistant Examiner*—Adam Arnold
(74) *Attorney, Agent, or Firm*—Joseph R. Burwell; Jeffrey S. LaBaru (57) ABSTRACT

A methodology for generating a drop shadow effect for objects in a graphical user interface is presented. A first object in a presentation space occludes the illumination from a simulated light source, and a dynamically determined drop shadow from the first object may partially occlude a second object. A portion of a drop shadow from the first object is shown on the second object; the portion of the drop shadow from the first object is displaced from the first object in direct proportion to a z-depth difference between the first object and the second object. Hence, a drop shadow can be generated in a computationally inexpensive manner, and the dynamically determined drop shadow enhances the perception of depth within the presentation space by a user.

13 Claims, 4 Drawing Sheets

U.S. PATENT DOCUMENTS

| | | | |
|---|---|---|---|
| 5,923,324 A | 7/1999 | Berry et al. | 345/334 |
| 5,960,448 A | 9/1999 | Reichek et al. | 707/526 |
| 6,014,472 A * | 1/2000 | Minami et al. | 382/285 |
| 6,018,350 A | 1/2000 | Lee et al. | 345/426 |
| 6,043,818 A | 3/2000 | Nakano et al. | 345/355 |
| 6,043,824 A | 3/2000 | Bier | 345/435 |
| 6,072,501 A | 6/2000 | Bier | 345/433 |
| 6,185,582 B1 | 2/2001 | Zellweger et al. | 707/503 |
| 6,191,790 B1 | 2/2001 | Bogdan | 345/426 |
| 6,229,542 B1 | 5/2001 | Miller | 345/358 |
| 6,243,093 B1 | 6/2001 | Czerwinski et al. | 345/355 |

* cited by examiner

METHOD AND SYSTEM FOR PRODUCING DYNAMICALLY DETERMINED DROP SHADOWS IN A THREE-DIMENSIONAL GRAPHICAL USER INTERFACE

BACKGROUND OF THE INVENTION

1. Field of the Invention

The present invention relates to an improved data processing system and, in particular, to a method and system for displaying graphical objects. Still more particularly, the present invention provides a method and system for rendering graphical objects in a three-dimensional operator interface or graphical user interface (GUI) environment.

2. Description of Related Art

A windowing metaphor is commonly used in graphical user interfaces of modern computer systems. The use of windows allows multiple application programs to simultaneously represent more than one set of display data on a single computer monitor. A graphical user interface typically allocates at least one display window on the computer screen for each executing application program.

Most windowing systems manage the limited resource of screen space by manipulating a so-called two-and-one-half (2½D) dimensional presentation space in which the presentation space has dimensions of horizontal and vertical coordinates (x-dimension and y-dimension) as well as an order for overlapping windows along a pseudo-vertical dimension (z-order). The windowing system maintains state information about the windows as planar objects within the presentation space. Typically, the windows may be moved by a user, which translates the window objects in the x-dimension and/or y-dimension. In addition, the user may change the z-order of the windows by selecting a window, thereby giving the so-called "focus" to a window and moving the selected window to the top of the z-order. In these windowing systems, the windows cannot be rotated within the presentation space.

The operating system software of a computer system typically contains embedded windowing software or graphical user interface software that manages the resulting set of possibly overlapping rectangular windows, thereby allowing application programs to draw on the portions of their windows that are visible, i.e., not obscured, clipped, or occluded by the screen extents of other windows. The operating system typically notifies application programs when portions of their windows become exposed and need to be repainted or redrawn. In some cases, application programs may request that a window manager program within the operating system handle these events directly from an off-screen memory such that the window manager program saves hidden portions of windows within the off-screen memory.

Over time, computer systems have increased the number of simultaneously supportable application programs, which also increased the number of windows likely to be shown on a user's screen at any given time. Moreover, each application program may have support for multiple open windows at any given time. Hence, the amount of information that may be displayed on a computer screen at any given time has continued to increase, which could potentially overload a user cognitively. As a result, graphical user interfaces have become more sophisticated in the manner in which the information is presented to the user. Various visual effects have been incorporated into graphical user interfaces that mimic visual effects to which a user is accustomed in the real world, thereby providing intuitive visual clues for the user that assists in the comprehension of the presented information. Typically, the windowing system or the operating system automatically provides these visual effects such that a developer of an application program does not need to be concerned with creating these visual effects.

Some graphical user interfaces have become quite sophisticated. By using many well-known computer imaging techniques, these graphical user interfaces have created full three-dimensional presentation spaces in which a user can manipulate graphical objects in a simulated three-dimensional environment. While these types of graphical user interfaces may be slightly more spatially intuitive for a user, any information must still be presented using some form of metaphor, and the computer skills of most users are not sophisticated enough to feel that these interfaces are useful. Moreover, these interfaces are computationally expensive to generate, thereby requiring computation resources that far exceed the computational resources of the common tasks of most users.

As a result, some common techniques from computer-generated-imaging (CGI) have been adapted for use within the graphical user interfaces that are employed on most computer systems. By adapting these techniques, the computational requirements can be reduced while still providing the benefits of intuitive visual effects.

For example, one category of visual effects that has been used within graphical user interfaces is lighting/shading. By simulating a light source within the presentation space of a graphical user interface and then lighting and/or shading various graphical objects within the graphical user interface, a subtle three-dimensional effect can be created that tends to emphasize or de-emphasize one or more objects that are shown on a computer display. A common use of this technique is to simulate thickness to a selectable button, and as a user selects the button, the graphical user interface simulates that the user is pressing the button.

Drop shadows are another form of lighting/shading that has been used within many graphical user interfaces. By simulating a light source within the presentation space of a graphical user interface and then generating a shadow that is slightly displaced beneath a graphical object, the graphical object can be made to appear as if it is floating slightly above another graphical object.

Another form of visual effect that has been introduced within some graphical user interfaces is the ability of a user to move a graphical object or window in a simulated vertical dimension, i.e. to translate a graphical object along a z-dimension within the presentation space of the graphical user interface. When the user alters the z-depth of a graphical object, the graphical user interface automatically resizes the selected graphical object to simulate the perceptual effects of distance. If the user moves the graphical object forward, i.e. pulls the graphical object toward the user along a z-axis in the presentation space of the graphical user interface, the graphical object grows in size, thereby requiring more screen space and cognitively emphasizing the graphical object to the user. If the user moves the graphical object backward, i.e. pushes the graphical object away from the user along a z-axis in the presentation space of the graphical user interface, the graphical object shrinks in size, thereby cognitively de-emphasizing the graphical object to the user.

Hence, a simplified, less computationally expensive, three-dimensional, graphical user interface can be provided in which the user is able to translate graphical objects in a z-direction without requiring the windowing system to fully simulate a three-dimensional presentation space in which the user can rotate objects within the simulated three-dimensional space or in which other three-dimensional computer-generated-imaging effects are simulated. By manipulating the z-depth of a graphical object, a user essentially zooms in or zooms out on the selected graphical object.

The amount of computational effort that is required to produce simple lighting/shading effects or drop shadows in a two-and-a-half-dimensional graphical user interface is minimal. Simplified three-dimensional graphical user interfaces can be created in which computational costs are minimized by including only certain visual effects. If the contents of a selected graphical object are enlarged or reduced in real-time during the operation of zooming in and out on the graphical object, the zooming operation may be computationally expensive, but after the zooming operation is completed, there are no additional computational costs to display the graphical object than would be required within a simpler two-and-a-half-dimensional graphical user interface.

While it is desirable to include shadowing effects within a three-dimensional graphical user interface, it is generally computationally prohibitive to do so. In order for the shadows to appear somewhat realistic, it would be necessary for the windowing system to perform some type of ray tracing operations in conjunction with the simulated light source, and ray tracing operations are very computationally expensive.

Therefore, it would be advantageous to provide some form of shadow effect within a three-dimensional presentation space of a graphical user interface such that the shadow effect enhances a user's intuitive understanding of the presentation space. It would be particular advantageous to provide a shadow effect within a three-dimensional presentation space of a graphical user interface that is computationally inexpensive, and more particularly, to provide a shadow effect within a three-dimensional presentation space of a graphical user interface that is similar to a drop shadow effect with which a user is familiar in a two-and-a-half-dimensional graphical user interface.

SUMMARY OF THE INVENTION

A method, a system, an apparatus, and a computer program product are presented for generating a shadow effect for objects in a graphical user interface. The graphical user interface simulates a three-dimensional coordinate space by displaying objects whose dimensions are computed in the three-dimensional coordinate space. A shadow object corresponding to a first object is generated, and a determination is made for an occluding region of the shadow object that partially occludes an illumination of a second object. A z-dimensional difference value between a z-value of the first object and a z-value of the second object is computed, and a translation value that is directly proportional to the computed z-dimensional difference value is calculated. The occluding region of the shadow object is translated along an x-dimension or a y-dimension within the three-dimensional coordinate space in accordance with the calculated translation value. The first object, an unoccluded portion of the second object, and the occluding region of the shadow object are then displayed on a display device.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to a visual effect that is associated with graphical objects that are presented within a graphical user interface on a computer display device. It should be noted that a dynamically determined drop shadow that is generated in accordance with the present invention can be generated on a computer device and presented on a display device that is connected to the generating computer device. In other cases, however, the dynamically determined drop shadow of the present invention can be generated in conjunction with other graphical data on a first computer device and then sent to a second computer device that subsequently displays the graphical data. Therefore, as background, a typical organization of hardware and software components within a distributed data processing system is described prior to describing the present invention in more detail.

Figure 1A:
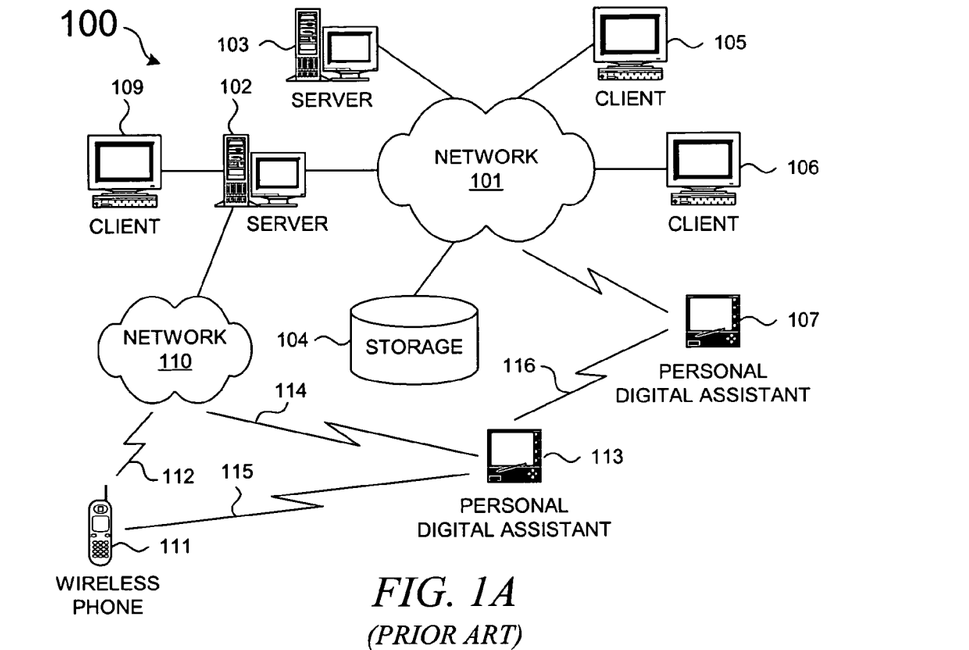
FIG. 1A depicts a typical distributed data processing system in which the present invention may be implemented.

With reference now to the figures, FIG. 1A depicts a typical network of data processing systems, each of which may implement some aspect of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown. It should be noted that the distributed data processing system shown in FIG. 1A is contemplated as being fully able to support a variety of peer-to-peer subnets and peer-to-peer services.

In the depicted example, distributed data processing system 100 may include the Internet with network 101 representing a global collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), a wireless LAN, or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
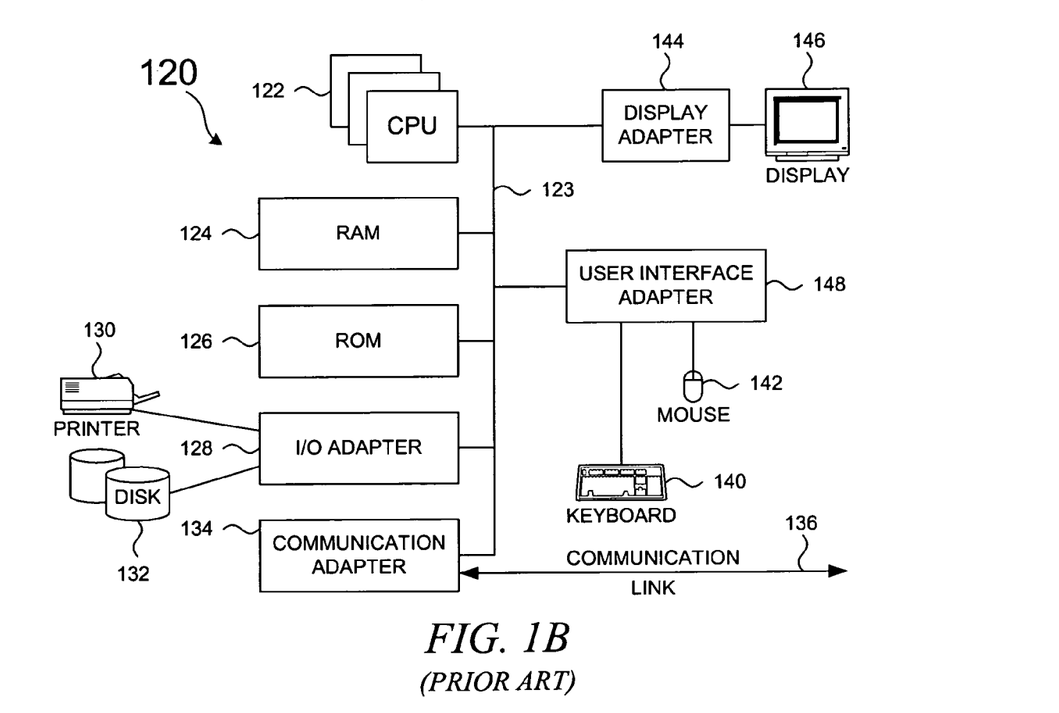
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140, mouse 142, or other devices not shown, such as a touch screen, stylus, or microphone. Display adapter 144 connects system bus 123 to display 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Linux® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), Virtual Reality Markup Language (VRML), and various other formats and types of files.

The present invention may be implemented on a variety of hardware and software platforms, as described above, and within layered applications, such as Photoshop™ or other graphics editors. More specifically, though, the present invention is directed to a dynamically determined drop shadow within a graphical user interface. Before describing the present invention in more detail, though, some background information is provided on graphical object processing and drop shadow effects.

An objective in some graphics rendering systems is to represent a presentation space or scene that is so realistic that the observer believes the scene is real. A fundamental difficulty in achieving total visual realism is the complexity of accurately representing real-world visual effects. A scene can include a wide variety of textures, subtle color gradations, reflections, translucency, shadows, etc. One way to make images more realistic is to determine how objects in a scene cast shadows and then represent these shadows in the rendered image that is displayed for the scene. When a presentation space is eventually displayed using a two-dimensional display space of a display device, the presentation space must be rendered as a two-dimensional image; shadows enhance the realism of an image because they give a three-dimensional feel to a two-dimensional image.

In three-dimensional graphics applications, objects in a scene are represented by three-dimensional graphical models, which include geometric data used to model the surface and position of the objects, and visual attributes used to model their appearance. There are a number of ways that a geometric model can represent a three-dimensional object, including polygon meshes, parametric surfaces, or quadratic surfaces. The surface elements, such as polygons, are referred to as geometric primitives. Visual attributes such as red, green, and blue color data, and possibly other model data, are typically stored in a data structure representing the vertices of the polygons.

In the rendering process, the geometric primitives corresponding to objects in a scene are processed to generate a display image. In the context of three-dimensional graphics, the rendering process includes transforming the objects to display device coordinates, and rasterizing the geometric primitives in the models to generate pixel values for the pixel elements of a display image. Potentially visible objects in a particular scene are identified by transforming objects into a common three-dimensional coordinate system and then determining whether the objects overlap a view volume, which is a three-dimensional space defining the bounds of a scene. The geometric primitives of potentially visible objects are then transformed to display device coordinates and rasterized into pixel data. Before rasterizing the primitives, it is common to eliminate surfaces that face away from the viewpoint in a process known as "backface culling."

Rasterizing generally refers to the process of computing a pixel value for a pixel based on data from the geometric primitives that project onto or "cover" the pixel. As part of the rendering process, hidden surface removal is performed on the potentially visible objects in a scene. Objects are referred to as potentially visible because they reside in or overlap the view volume. However, some of the objects or parts of objects in the view volume will not be represented in the rendered image because they are blocked or occluded by other objects. Hidden surface removal refers to the process of determining which objects or portions of objects are, and conversely, are not, visible in the scene. During this process, the graphics system determines which objects or portions are visible from the viewpoint.

One approach to hidden surface removal is referred to as the z-buffer algorithm. In this approach, a "z-buffer" is used to perform hidden surface removal on pixel data generated as primitives are rasterized. The letter "z" refers to a depth value and originates from the common practice of expressing distance from the viewpoint using the z-axis in a three-dimensional coordinate system. The z-buffer is used to store pixels closest to the viewpoint for each pixel location in an image. As a primitive is rasterized, pixel data including a depth value is generated. The depth of a newly generated pixel is compared with a pixel stored in the z-buffer for the same pixel location. If the newly generated pixel is further from the view point than the stored pixel, it is rejected. If not, it replaces the pixel stored in the z-buffer. This process continues until an entire frame of pixels is generated.

Just as objects can occlude other objects from the perspective of the view point, some objects can occlude other objects from the perspective of a light source. In this case, objects closer to the light source can cast a shadow on other objects in the scene. "Shadowing" refers to the process of determining which objects are shadowed and then representing those shadows in a rendered image.

The following figures are described with the assumption that various graphical programming techniques, such as z-buffering, hidden surface removal algorithms, etc., are well-known. It should also be noted that the graphical programming techniques may be embedded in software, in hardware, or in a combination of both hardware and software.

Figures 2A, 2B:
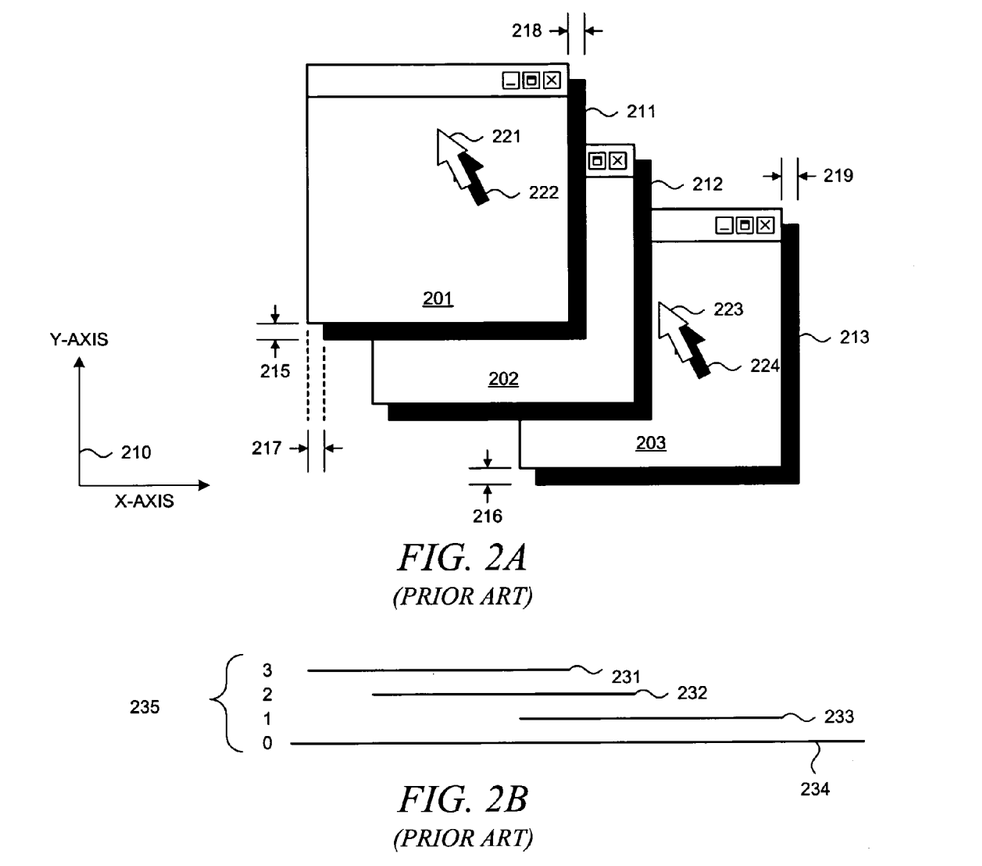
FIG. 2A depicts a typical set of windows with drop shadows within a two-and-a-half-dimensional graphical user interface.
FIG. 2B depicts a typical z-ordering relationship among a set of graphical objects in a graphical user interface.

With reference now to FIG. 2A, a typical set of windows with drop shadows within a two-and-a-half-dimensional graphical user interface is shown. Windows 201-203 are shown using a perspective in which a user is looking at a computer display on which the windows are presented; the set of windows may have been generated by the graphical user interface software or windowing system of a computer device connected to the computer display. The graphical objects are shown on a display device after being rendered into a two-dimensional bitmap or image in accordance with a two-dimensional coordinate space 210 that represents the objects prior to rendering for the display device.

Windows 201-203 have been generated in a so-called two-and-a-half-dimensional graphical user interface in which the windows are organized according to a z-ordering relationship. Each window is said to be either "in front of" or "in back of" another window along a pseudo z-dimension perpendicular to coordinate space 210. In this manner, window 201 is in front of window 202, i.e. higher in the z-ordering relationship, so a portion of window 201 occludes a portion of window 202; the windowing system must clip the graphical content of window 202 so that window 201 can appear as if it is in back of window 201. In a similar manner, both windows 201 and 202 are in front of window 203, so window 203 is displayed such that it appears to be in back of windows 201 and 202. Windowing techniques such as those shown in FIG. 2A are well-known in the art.

FIG. 2A also shows a well-known visual effect of associating drop shadows 211-213 with windows 201-203, respectively. The windowing system has created drop shadows by generating shadow objects for each of the windows within the presentation space of the graphical user interface, and these shadow objects were subsequently rendered in a manner similar to windows 201-203. Drop shadow 211 associated with window 201 is presented so that it also partially occludes window 202. Given that the graphical user interface is simulating a light source that generates shadows for the windows, it may be said that drop shadow 211 overlaps or partially occludes the illumination of window 202. Using the convention that the objects in the graphical user interface are realistically presented, drop shadow 211 can also be said to fall upon window 202. In a similar manner, drop shadow 212 falls upon window 203.

The graphical user interface is typically organized using some type of metaphor such that the objects within the graphical user interface mimic real-life objects that would be familiar to a user of the graphical user interface. Most operating systems support a so-called "desktop" metaphor in which certain datasets are represented as files or folders, and each file or folder can be presented within its own window. In this type of environment, the background of the user interface typically represents the desktop of a desk on which a user organizes a set of files and/or folders. Hence, the background "behind" windows 201-203 is the desktop, and drop shadow 213 of window 203 falls on the desktop, i.e. partially occludes the illumination of the desktop.

Drop shadows 211-213 have uniform dimensions. As is apparent by simple inspection of FIG. 2A, drop shadow 211 is offset from window 201 along the y-direction by displacement value 215; similarly, drop shadow 213 is offset from window 203 along the y-direction by displacement value 216. Drop shadow 211 is offset from window 201 along the x-direction by displacement value 217, which matches displacement value 218, i.e. displacements 217 and 218 are equal. Similarly, drop shadow 213 is offset from window 203 along the x-direction by displacement value 219.

Typically, a graphical user interface presents a movable cursor that allows a user to select and manipulate objects within the presentation space. In FIG. 2A, the graphical user interface displays a cursor as pointer 221.

In a manner similar to windows 201-203, pointer 221 has also been displayed in conjunction with a drop shadow effect, shown as drop shadow 222, which causes a visual effect as if pointer 221 is floating above window 201; in other words, pointer 221 appears to be in front of window 201 in the ordering relationship within the presentation space. As the user moves the cursor around the presentation space, the cursor's drop shadow follows the cursor. Pointer 223 represents the cursor after the user has moved the cursor to a different location within the presentation space; pointer 223 is shadowed by drop shadow 224. As is apparent by inspection of FIG. 2A, pointer 223 also appears to float in front of window 203.

More importantly for purposes of this discussion, pointer 223 appears to float above window 203 at a distance that is equal to the distance at which pointer 221 appears to float above window 201. This illusion is caused by the fact that drop shadows 222 and 224 are displaced equidistantly from pointers 221 and 223, respectively. It is important to note this effect because it demonstrates that windows 201-203, drop shadows 211-213, pointers 221 and 223, and pointer shadows 222 and 224 are represented within the presentation space of the graphical user interface using an ordering relationship, not a spatial relationship. Each graphical object in the presentation space of the graphical user interface is assigned a position within the z-ordering relation that is maintained by the graphical user interface; the graphical objects are not given spatial relationships along a true vertical axis that would be perpendicular to the plane of the display device, which is represented by x-y coordinate space 210. This is shown more fully with respect to FIG. 2B and FIG. 2C.

With reference now to FIG. 2B, a typical z-ordering relationship among a set of graphical objects in a graphical user interface is shown. Objects 231-234 are shown as being above or below each other; for example, object 231 is above object 232, etc.

Objects 231-233 have been positioned and sized to appear as if these objects are identical to windows 201-203 shown in FIG. 2A. Objects 231-233 appear as if a user perspective has been rotated about the x-axis so that the user is viewing the edges or widths of windows 201-203; however, windows 201-203 are not represented within a true three-dimensional presentation space, so it is not possible to truly rotate within the presentation space of the graphical user interface in this manner, and this description is only for explanatory purposes only. Using this perspective, object 234 can be said to represent the desktop below windows 201-203.

Objects 231-234 are actually organized within the graphical user interface using a z-ordering relationship, shown as z-order 235. Each object is assigned a position within the z-ordering relationship, and as a user moves the focus between objects or windows, the z-order is adjusted so that the windowing system may determine which objects are occluded by other objects.

Figure 2C:
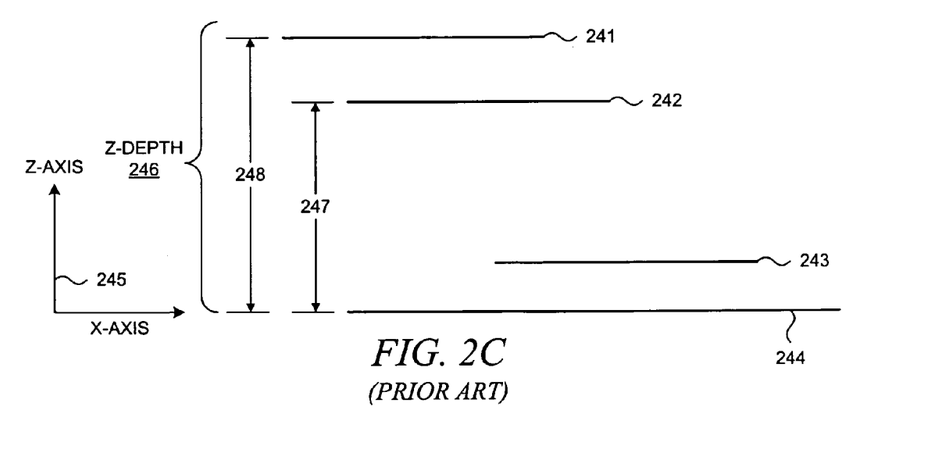
FIG. 2C depicts an organization of objects within a presentation space of a typical three-dimensional graphical user interface.

With reference now to FIG. 2C, an organization of objects within a presentation space of a typical three-dimensional graphical user interface is shown. Objects 241-244 are shown as being above or below each other; for example, object 241 is above object 242, etc.

Objects 241-243 have been positioned and sized to appear as if these objects are identical to windows 241-243 shown in FIG. 2A. Objects 241-243 appear as if a user perspective has been rotated about the x-axis so that the user is viewing the edges or widths of windows 201-203. In contrast to the representation of objects 231-233 in FIG. 2B, this explanation for the representation of the objects within FIG. 2C is realistic. Although windows 201-203 are not represented within a true three-dimensional presentation space in FIG. 2A, similar window objects could be created and displayed within a three-dimensional graphical user interface. In this case, it would be valid to state that the user perspective has been rotated within the presentation space of the graphical user interface in this manner; coordinate space 245 shows that the user perspective is viewing the presentation space in a direction along the y-axis of the three-dimensional coordinate space of the graphical user interface. Using this perspective, object 244 can be said to represent a desktop below objects 241-243 within the presentation space.

In this example, objects 241-244 can be validly described as being organized within the graphical user interface's presentation space using a z-dimensional relationship, shown as z-depth 246. Each object is assigned a height along the z-axis or z-dimension. Using desktop object 244 as the reference object, object 242 can be described as being distance 247 above desktop object 244, and object 241 can be described as being distance 248 above desktop object 244. In the three-dimensional graphical user interface associated with the presentation space shown in FIG. 2C, a user can move or translate the objects along the z-direction, and the graphical user interface would zoom in or out the moved object; the z-depth of a moved object would be adjusted accordingly. Moving an object along the z-direction may change the ordering of the objects within the presentation space, thereby changing the manner in which the objects occlude each other, which in turn requires that the graphical user interface must change the manner in which the objects are clipped prior to displaying the objects.

It should be noted again that the techniques described with respect to FIGS. 2A-2C are well-known in the art; various algorithms and hardware for implementing shadow effects can be found in Snyder et al., "Method and system for improving shadowing in a graphics rendering system", U.S. Pat. No. 5,870,097, issued Feb. 9, 1999, hereby incorporated by reference. Moreover, various additional shadowing effects are known and can be employed when rendering the drop shadows that shown in FIG. 2A. For example, the drop shadows can be generated so that they are lighter by making the shadows partially transparent rather than opaque; various transparency effects can be found in Frank et al., "Method and system for presenting information in a display system using transparent windows", U.S. Pat. No. 5,651,107, issued Jul. 22, 1997, hereby incorporated by reference. Another effect that can be applied to a drop shadow is associated with a diffuse light source, which causes a shadow to have a less well defined edge; various shadow texturing techniques can be found in Soler et al., "Fast calculation of soft shadow textures using convolution", Proceedings of the 25th Annual Conference on Computer Graphics, pp. 321-332, Jul. 19, 1998, hereby incorporated by reference. Other characteristics of drop shadows, such as size, color, and offset distance can be changed or manipulated in accordance with user preferences; various drop shadowing effects can be found in Reichek et al., "System and method for displaying a graphically enhanced view of a region of a document image in which the enhanced view is correlated with text derived from the document image", U.S. Pat. No. 5,960,448, issued Sep. 28, 1999, hereby incorporated by reference.

Figures 2D, 2E, 3:
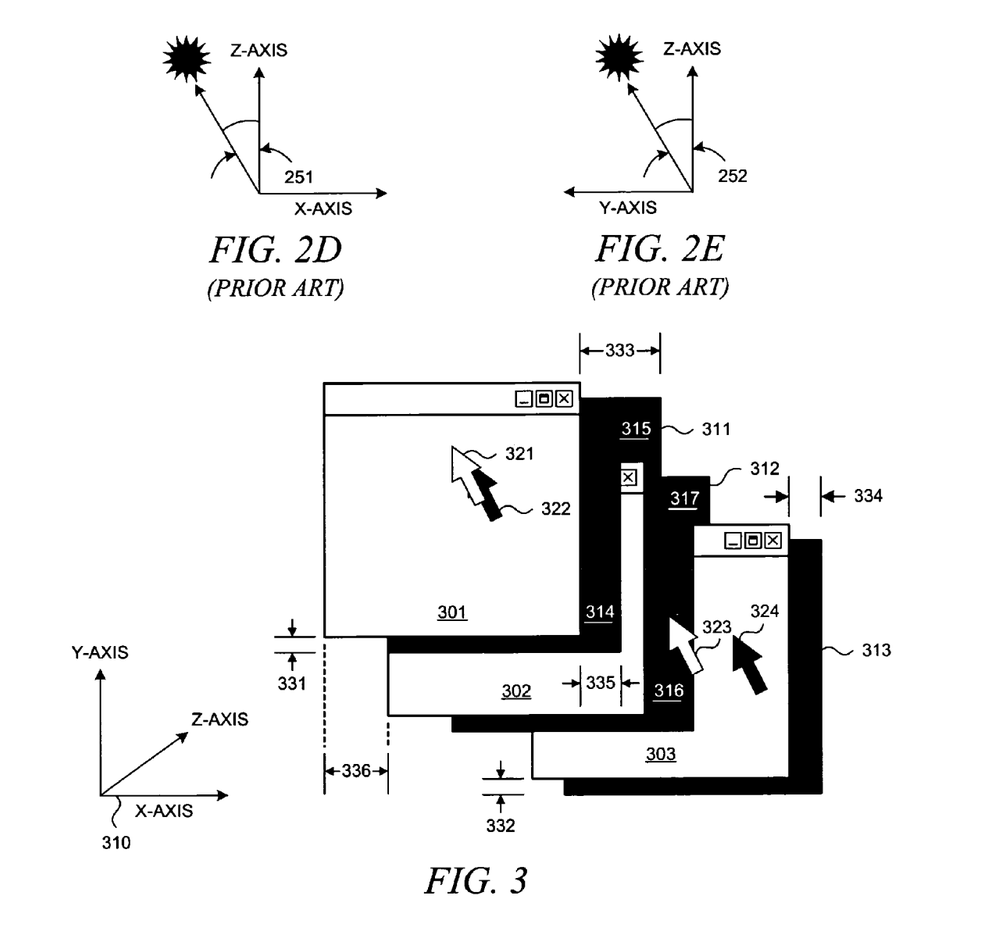
FIGS. 2D-2E depicts a set of diagrams showing a light source within a presentation space of a graphical user interface in order to explain a manner of interpreting the lighting effect that causes drop shadows within FIG. 2A.
FIG. 3 depicts a set of windows within a three-dimensional graphical user interface in which dynamically determined drop shadows have been associated with a set of windows in accordance with the present invention.

With reference now to FIGS. 2D-2E, a set of diagrams show a light source within a presentation space of a graphical user interface in order to explain a manner of interpreting the lighting effect that causes drop shadows within FIG. 2A. Although a three-dimensional presentation space is shown in the figures, drop shadows within a two-and-a-half-dimensional presentation space can be interpreted in a similar manner without assuming that a z-dimension is present within the coordinate system of the two-and-a-half-dimensional presentation space.

Referring to FIG. 2D, a simulated light source is shown as being displaced from an overhead, "noon" position by a slight angle 251 along the x-axis; in other words, the light source has been slightly rotated about the y-axis. This rotation acts as the "cause" for a slight offset in the x-direction for a drop shadow associated with an object. For example, offset 217 in FIG. 2A is caused by the simulated light source being displaced by a small amount from an overhead position along the x-axis in a manner similar to that shown in FIG. 2D. Moreover, offset 217 is directly proportional to angle 251 in FIG. 2D.

Referring to FIG. 2E, a simulated light source is shown as being displaced from an overhead, "noon" position by a slight angle 252 along the y-axis; in other words, the light source has been slightly rotated about the x-axis. This rotation acts as the "cause" for a slight offset in the y-direction for a drop shadow associated with an object. For example, offset 215 in FIG. 2A is caused by the simulated light source being displaced by a small amount from an overhead position along the y-axis in a manner similar to that shown in FIG. 2E. Moreover, offset 215 is directly proportional to angle 252 in FIG. 2E.

FIG. 2C showed a set of objects arranged within a three-dimensional presentation space of a three-dimensional graphical user interface. Although it has been known to use drop shadows in a three-dimensional graphical user interface, and although those drop shadows may provide a user with some depth information, the present invention recognizes that drop shadows in three-dimensional graphical user interfaces may be represented in a more realistic manner by determining aspects of the drop shadows in accordance with depth information associated with occluding objects within the presentation space. In addition, the present invention provides a fast methodology for generating these dynamically determined drop shadows.

With reference now to FIG. 3, a set of windows are shown within a three-dimensional graphical user interface in which dynamically determined drop shadows have been associated with the set of windows in accordance with the present invention. Windows 301-303 are shown using a perspective in which a user is looking at a computer display on which the windows are presented; the set of windows may have been generated by the graphical user interface software or windowing system of a computer device connected to the computer display. The graphical objects are shown on a display device after being rendered into a two-dimensional bitmap or image in accordance with a three-dimensional coordinate space 310 that represents the objects prior to rendering for the display device.

Windows 301-303 have been generated in a three-dimensional graphical user interface in which the windows are organized with respect to a z-depth relationship along a z-dimension. Each window is said to be either "in front of" or "in back of" another window along the z-dimension perpendicular to a plane representing the surface of the display device. In this manner, window 301 is in front of window 302; in other words, window 301 has a greater z-value, so a portion of window 301 occludes a portion of window 302. In a similar manner, both windows 301 and 302 are in front of window 303, so window 303 is displayed such that it appears to be in back of windows 301 and 302.

FIG. 3 also shows a visual effect of associating dynamically determined drop shadows 311-313 with windows 301-303, respectively, in accordance with the present invention. The windowing system has created dynamically determined drop shadows by generating drop shadow objects for each of the windows within the presentation space of the graphical user interface, and these drop shadow objects were subsequently rendered in a manner similar to windows 301-303. Windows 301-303 can be said to be "occluding objects" that occlude the illumination of other objects. In this example, windows 301-303 are opaque objects that "cast" a dark, well-defined shadow; however, if windows 301-303 are partially transparent, their associated shadows may be lighter in color instead of completely dark.

Dynamically determined drop shadow 311, which is associated with window 301, is presented such that it partially occludes window 302, shown as being occluded by drop shadow region 314. Given that the graphical user interface is simulating a light source that generates shadows for the windows, it may be said that drop shadow region 314 overlaps or partially occludes the illumination of window 302. Using the convention that the objects in the graphical user interface are realistically presented, drop shadow region 314 can also be said to fall upon or be cast upon window 302. In addition, window 301 "casts" its shadow such that a portion of its dynamically determined drop shadow falls on the desktop; this portion of the dynamically determined drop shadow is shown as drop shadow region 315.

In a similar manner, dynamically determined drop shadow 312 is associated with window 302. A portion of the dynamically determined drop shadow of window 302 falls upon window 303, shown as drop shadow region 316; another portion of the dynamically determined drop shadow of window 302 falls upon the desktop, which is shown as drop shadow region 317. Window 303 occludes a portion of the desktop but does not occlude any windows or other objects; hence, its dynamically determined drop shadow only falls upon the desktop.

In a manner similar to that shown in FIG. 2A, the graphical user interface displays a cursor as pointer 321. In a manner similar to windows 301-303, pointer 321 has also been displayed in conjunction with a dynamically determined drop shadow effect, shown as drop shadow 322, which causes a visual effect as if pointer 321 is floating above window 301; in other words, pointer 321 appears to be in front of window 301 within the presentation space.

As the user moves the cursor around the presentation space, the cursor's drop shadow follows the cursor. Pointer 323 represents the cursor after the user has moved the cursor to a different location within the presentation space; pointer 323 is shadowed by dynamically determined drop shadow 324. As is apparent by inspection of FIG. 3, pointer 323 also appears to float in front of window 303.

However, in contrast to dynamically determined drop shadow 322, dynamically determined drop shadow 324 is offset a greater distance from pointer 323 than dynamically determined drop shadow 322 is offset from pointer 321; dynamically determined drop shadow 324 causes a user to perceive that pointer 323 is much higher above window 303 than pointer 321 is above window 301.

The reason for the difference is offset distances for the drop shadows associated with the pointers is caused by the fact that the drop shadows that are shown in FIG. 3 are generated in a dynamic fashion rather than the static fashion shown in FIG. 2A. In FIG. 2A, the drop shadows had a uniform offset distance from their associated objects. In other words, the drop shadows were statically defined, whether or not the user had the option of setting a predetermined offset or size for the drop shadow. Even if the user had specified various aspects of the drop shadow, the drop shadow for any object would be presented in the same manner.

In contrast, as shown in FIG. 3, the drop shadows are dynamically determined based on the z-dimensional difference value between the z-depth of the occluding object that causes an associated shadow and z-depth of the occluded object on which the shadow falls; if the shadow falls on more than one object, then the position of the shadow on a given object depends on the occluded object's z-depth value and the z-depth value of the occluding object.

Hence, pointer 323 appears to float above window 303 at a distance that greater than the distance at which pointer 321 appears to float above window 301. This illusion is caused by the fact that drop shadows 322 and 324 are displaced differently from pointers 321 and 323, respectively. It is important to note this visual effect because it demonstrates that windows 301-303, dynamically determined drop shadows 311-313, pointers 321 and 323, and dynamically determined drop shadows 322 and 324 are represented within the presentation space of the graphical user interface using a spatial relationship, not an ordering relationship as is the case in FIG. 2A. In the example in FIG. 3, each graphical object in the presentation space of the graphical user interface is assigned a spatial relationship along a true vertical axis that would be perpendicular to the plane of the display device, which would be represented by an x-y plane in three-dimensional coordinate space 310. In other words, windows 301-303 may be organized in a manner similar to that shown in FIG. 2C, and the dynamically determined drop shadows are generated using the z-depth information shown in FIG. 2C.

As a result, dynamically determined drop shadows 311-313 do not have uniform dimensions. As is apparent by simple inspection of FIG. 3, dynamically determined drop shadow 311 is offset from window 301 along the y-direction by displacement value 331; similarly, drop shadow 313 is offset from window 303 along the y-direction by displacement value 332, and displacement values 331 and 332 are equal.

However, dynamically determined drop shadow 311 is offset from window 301 along the x-direction by displacement value 333, which does not match displacement value 334, i.e. displacements 333 and 334 are not equal. This difference is caused by the fact that drop shadow 313 for window 303 has been determined in a dynamic fashion in accordance with the z-depth value of window 303, i.e. the different in z-values between window 303 and the desktop.

In contrast, drop shadow 311 for window 301 has been determined in a dynamic fashion in accordance with the z-depth value of window 301; drop shadow 311 appears to occlude other objects based on the difference in z-depths of window 301 and whatever object is being occluded. Hence, drop shadow region 315, which falls on the desktop, has been displaced by offset distance 333, whereas drop shadow region 314, which falls on window 302, has been displaced by offset distance 335; the difference in z-values between window 301 and the desktop is greater than the difference in z-values between window 301 and window 302, thereby resulting in a greater x-dimensional offset in the methodology of the present invention. This effect is also shown in the fact that window 301 does not have any drop shadow within region 336; the drop shadow that would be associated with the "lower left" corner of window 301 has been offset using a distance that results in the drop shadow being occluded by window 302.

It should be noted that the dynamically determined drop shadows shown in FIG. 3 have been generated using a simulated light source with a position that is similar to the position of the simulated light source in FIGS. 2D-2E. The manner in which the drop shadows have been determined within FIG. 3 is different from the manner in which the drop shadows were determined within FIG. 2A. Hence, the varying offsets for the drop shadows in FIG. 3 are caused by the manner in which the drop shadow offsets are computed, not by adjusting the position of the simulated light source. However, it should be understood that a more dramatic, dynamically determined drop shadow could be generated by adjusting the position of the simulated light source, thereby offsetting the drop shadows by a greater amount.

In summary, any portion of a drop shadow that may occlude another object, i.e. may fall on another object, is determined, e.g., using various well-known occlusion or z-depth algorithms. For example, for each object that is below the occluding object, the portion of the drop shadow from the occluding object is translated, i.e. offset, in accordance with a direct relationship with the z-depth difference between the potentially occluded object and the occluding object. In other words, the amount that the drop shadow is offset for a given occluding object and a potentially occluded object is computed by:

Drop Shadow Offset=k*(delta_z_value), wherein delta_z_value equals the difference in the z-value of the occluding object and the potentially occluded object. The sign of the difference may be changed depending on the desired direction of the offset along the chosen dimension. The computation is similar whether or not the offset is made along the x-dimension or the y-dimension. The constant "K" illustrates that the offset value is directly proportional to the difference in z-values; "K" may be derived in accordance with a desired position of a simulated light source, a value specified by a user, or a combination of considerations.

Figure 4:
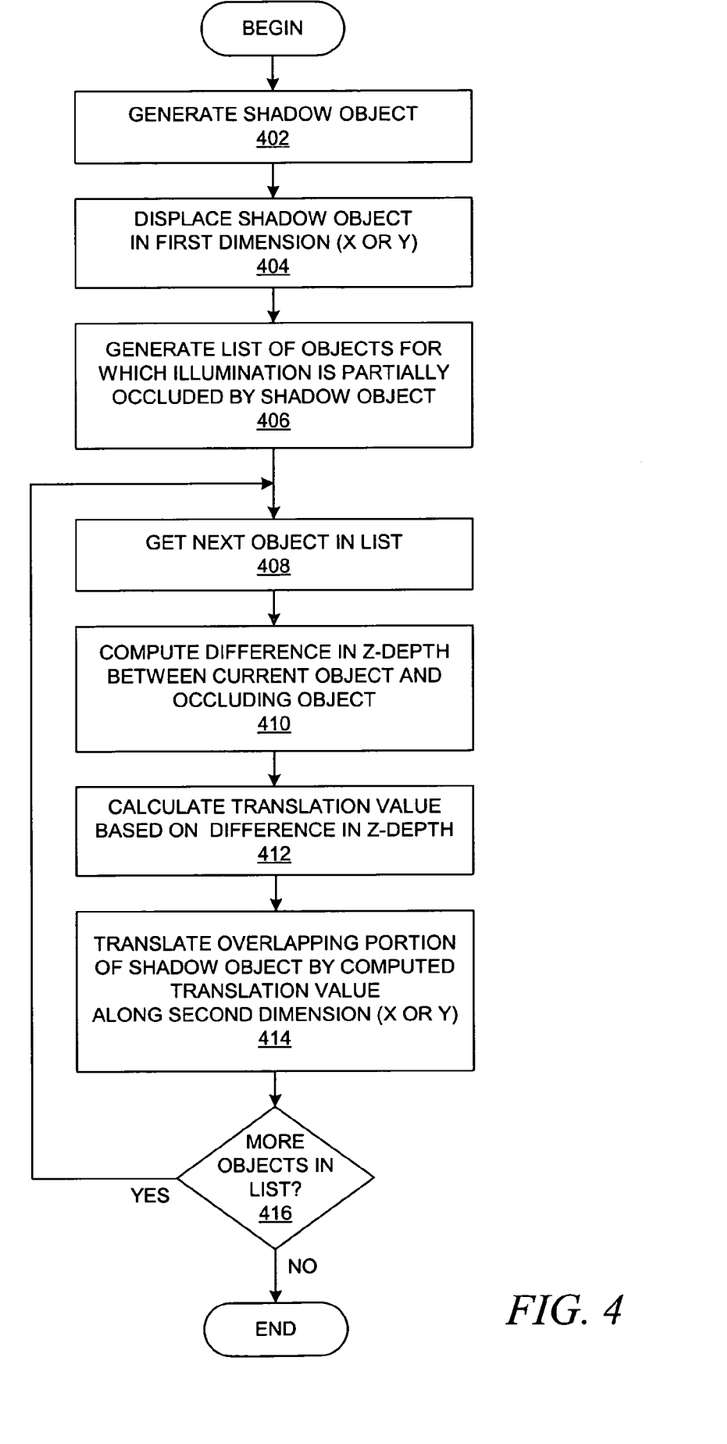
FIG. 4 depicts a flowchart for a process to generate dynamically determined drop shadow objects or regions in accordance with the present invention.

With reference now to FIG. 4, a flowchart for a process to generate dynamically determined drop shadow objects or regions in accordance with the present invention is shown. It should be noted that the process shown in FIG. 4 illustrates merely one manner of creating the visual effect herein termed a dynamically determined drop shadow, and additional or alternative process steps could be used in generating a dynamically determined drop shadow.

The process begins by generating a shadow object of the same size and dimensions as an object within the presentation space that is occluding illumination from a simulated light source (step 402). Because the occluding object's shadow is not distorted, as might be required in generating a realistic shadow, the shadow object can be generated at high speed with low computational cost.

The shadow object is then displaced along a first dimension in accordance with a predetermined value (step 404). This value may be derived from a user-specified configuration parameter, from a position of a simulated light source, or a combination of considerations. This initial displacement of the shadow object may be along the x-dimension or the y-dimension. In a preferred embodiment, this initial displacement is uniform among all objects within the presentation space for which a dynamically determined drop shadow is being associated.

It should be noted that the drop shadow effect could be turned on or off in accordance with a configuration parameter chosen by a user. In addition, the graphical user interface may automatically select different types of objects with which drop shadows should be associated. For example, drop shadows might be automatically associated with windows and cursors but not with other forms of objects within the presentation space of the graphical user interface; the user may be allowed to select which types of objects have associated drop shadows.

A list of objects that are partially/wholly occluded or may be partially/wholly occluded by the shadow object is then generated (step 406). Within this step, it is possible that a shadow object may only potentially partially or wholly occlude an object; when the shadow object is subsequently translated in accordance with the drop shadow effect, as explained below in more detail, it might be possible that the potentially occluded object is no longer occluded, i.e. the translation moves the shadow object or region such that it no longer occludes the object. Hence, such objects would be excluded in this step, i.e. not placed on this list, or these objects would be removed from the list at a subsequent point in time as no longer being relevant to the particular shadow object.

After the list of occluded objects is generated, then a next occluded object in the list is obtained (step 408); this object becomes the current object that is being processed. In essence, the process loops through the list of objects and processes each object in turn. The difference in z-values, i.e. z-depths, for the current object and the occluding object is then computed (step 410). Based on the computed z-value difference, a translation value, i.e. offset value, is then calculated (step 412).

Using the calculated offset value, the portion of the shadow object that overlaps or occludes the current object is translated by the offset value (step 414). This second displacement of the portion of the shadow object is along the alternative dimension than was used for the first displacement operation; in other words, if the first displacement was along the x-dimension, then the second displacement is along the y-dimension, and vice versa.

Since the processing of the current object has been completed, a determination is made as to whether or not another object remains unprocessed in the list of occluded objects (step 416). If so, then the process branches back to step 408 to obtain and process another occluded object; if not, then the process is complete.

In this manner, a portion of the shadow object that occludes the current object is displaced or "dropped" by a desired offset in two dimensions using a process that is relatively inexpensive to compute. In this example, this portion of the shadow object is stored with the other objects within data structures of the presentation space, e.g., z-buffer, until the rendering engine needs to render the bitmap for the display device. As the rendering engine performs its hidden surface removal operations, the dynamically determined drop shadow region will be found to occlude one or more objects, and the presentation space will be rendered appropriately. If the rendering engine uses some other type of algorithm, the dynamically determined drop shadow region or object will be appropriately rendered into the image that represents the presentation space.

The advantages of the present invention should be apparent in view of the detailed description of the invention that is provided above. In the prior art, shadow effects within three-dimensional graphical user interfaces have been computationally expensive to create because the shadows of the graphical objects within the presentation space have been realistically simulated using realistic lighting conditions within the presentation space of the three-dimensional graphical user interface.

In contrast, the present invention recognizes that a shadow effect within the presentation space of a three-dimensional graphical user interface can be generated in a computationally inexpensive manner; relatively complex shadow shapes can be generated for relatively little computational cost. More importantly, the dynamically determined drop shadow of the present invention enhances the perception of depth within the presentation space by a user. In addition, the visual effect provided by the dynamically determined drop shadow of the present invention should be quickly perceptible and understandable to a user that is familiar with drop shadows in a two-and-a-half-dimensional graphical user interface.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links. For example, it should be noted that the visual effect of the dynamically determined drop shadow of the present invention need not be stored only in a volatile data structure but may be captured in a variety of descriptive manners. For example, a dynamically determined drop shadow could be described within a markup language tag and other type of parameter and stored in a file, possibly within a human readable file.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for generating a shadow effect for objects in a graphical user interface, wherein the graphical user interface simulates a three-dimensional coordinate space by displaying objects whose dimensions are computed in the three-dimensional coordinate space, the method comprising:
   generating a shadow object corresponding to a first object, wherein the shadow object has dimensions and coordinates that are identical to the first object;
   displacing the shadow object along an x-dimension or a y-dimension of the three-dimensional coordinate space by a user-configurable displacement distance value;
   computing a z-dimensional difference value between a z-value of the first object and a z-value of a second object;
   calculating a translation value that is directly proportional to the computed z-dimensional difference value;
   translating the shadow object in accordance with the calculated translation value along the x-dimension or the y-dimension within the three-dimensional coordinate space that was not used to displace the shadow object such that the translation of the shadow object and the displacement of the shadow object occur along different dimensions in either order;
   determining an occluding region of the displaced, translated shadow object that partially occludes the second object; and
   displaying the first object, an unoccluded portion of the second object, and the occluding region of the shadow object on a display device.

2. The method of claim 1, wherein the first object, the unoccluded portion of the second object, and the occluding region of the shadow object are rendered into a bitmap prior to displaying on the display device.

3. The method of claim 1, wherein the shadow object is transparent.

4. The method of claim 1, wherein the shadow object is subjected to a diffusion filter.

5. The method of claim 1, wherein the objects are two-dimensional planar objects within the three-dimensional coordinate space, wherein the objects are parallel to an x-y plane in the three-dimensional coordinate space, wherein the objects may be translated along either of a set of three dimensions in the three-dimensional coordinate space but not rotated about an x-axis in the three-dimensional coordinate space or about a y-axis in the three-dimensional coordinate space.

6. A computer program product in a computer-readable medium for use in a data processing system for generating a shadow effect for objects in a graphical user interface, wherein the graphical user interface simulates a three-dimensional coordinate space by displaying objects whose dimensions are computed in the three-dimensional coordinate space, the computer program product comprising:
   instructions for generating a shadow object corresponding to a first object, wherein the shadow object has dimensions and coordinates that are identical to the first object;
   instructions for displacing the shadow object along an x-dimension or a y-dimension of the three-dimensional coordinate space by a user-configurable displacement distance value;
   instructions for computing a z-dimensional difference value between a z-value of the first object and a z-value of a second object;
   instructions for calculating a translation value that is directly proportional to the computed z-dimensional difference value;
   instructions for translating the shadow object in accordance with the calculated translation value along the x-dimension or the y-dimension within the three-dimensional coordinate space that was not used to displace the shadow object such that the translation of the shadow object and the displacement of the shadow object occur along different dimensions in either order;

instructions for determining an occluding region of the displaced, translated shadow object that partially occludes the second object; and instructions for displaying the first object, an unoccluded portion of the second object, and the occluding region of the shadow object on a display device.

7. The computer program product of claim 6, wherein the first object, the unocoluded portion of the second object, and the occluding region of the shadow object are rendered into a bitmap prior to displaying on the display device.

8. The computer program product of claim 6, wherein the shadow object is transparent.

9. The. computer program product of claim 6, wherein the shadow object is subjected to a diffusion filter.

10. The computer program product of claim 6, wherein the objects are two-dimensional planar objects within the three-dimensional coordinate space, wherein the objects are parallel to an x-y plane in the three-dimensional coordinate space, wherein the objects may be translated along either of a set of three dimensions in the three-dimensional coordinate space but not rotated about an x-axis in the three-dimensional coordinate space or about a y-axis in the three-dimensional coordinate space.

11. An apparatus for generating a shadow effect for objects in a graphical user interface, wherein the graphical user interface simulates a three-dimensional coordinate space by displaying objects whose dimensions are computed in the three-dimensional coordinate space, the apparatus comprising:

means for generating a shadow object corresponding to a first object, wherein the shadow object has dimensions and coordinates that are identical to the first object;

means for displacing the shadow object along an x-dimension or a y-dimension of the three-dimensional coordinate space by a user-configurable displacement distance value;

means for computing a z-dimensional difference value between a z-value of the first object and a z-value of a second object;

means for calculating a translation value that is directly proportional to the computed z-dimensional difference value; means for translating shadow object in accordance with the calculated translation value along the x-dimension or the y-dimension within the three-dimensional coordinate space that was not used to displace the shadow object such that the translation of the shadow object and the displacement of the shadow object occur along different dimensions in either order;

means for determining an occluding region of the displaced, translated shadow object that partially occludes the second object; and means for displaying the first object, an unoccluded portion of the second object, and the occluding region of the shadow object on a display device.

12. The apparatus of claim 11, wherein the first object, the unoccluded portion of the second object, and the occluding region of the shadow object are rendered into a bitmap prior to displaying on the display device.

13. The apparatus of claim 11, wherein the objects are two-dimensional planar objects within the three-dimensional coordinate space, wherein the objects are parallel to an x-y plane in the three-dimensional coordinate space, wherein the objects may be translated along either of a set of three dimensions in the three-dimensional coordinate space but not rotated about an x-axis in the three-dimensional coordinate space or about a y-axis in the three-dimensional coordinate space.

* * * * *